J. C. WELLS.
EYEGLASSES AND SPECTACLES.
APPLICATION FILED AUG. 22, 1910.

1,001,568.

Patented Aug. 22, 1911.

WITNESSES:
Raymond D. Wheeler
Joseph J. Demers

INVENTOR
JOEL C. WELLS
BY
Harry H. Styll
ATTORNEY

UNITED STATES PATENT OFFICE.

JOEL C. WELLS, OF SOUTHBRIDGE, MASSACHUSETTS.

EYEGLASSES AND SPECTACLES.

1,001,568.   Specification of Letters Patent.   Patented Aug. 22, 1911.

Application filed August 22, 1910. Serial No. 578,401.

*To all whom it may concern:*

Be it known that I, JOEL C. WELLS, a citizen of the United States, residing at Southbridge, in the county of Worcester and State of Massachusetts, have invented certain new and useful Improvements in Eyeglasses and Spectacles, of which the following is a specification.

My invention relates to improvements in clamping devices and is particularly intended for securing the lenses of frameless spectacles and eyeglasses. It, however, may be used for other purposes.

It has been found difficult in practice to prevent rimless lenses held between forked integral clamping members with the usual screw from working loose owing to the fact that the surface contact of the clamping members is insufficient to overcome the leverage of the lens. The lenses, consequently, work loose in the lens clamp and turn with the lens screw as a pivot. From the nature of the fitting the lens screw will bind on the side of the hole in the lens toward the bridge connection to the eyeglass, consequently, as the lens is rotated it engages and turns the lens screw with it, causing the screw to back out, and allowing the clamping members to become loose. In rimless lenses held between clamping members, one fixed with the bridge connection, and the other in the form of a loose ear or washer bearing directly on the face of the lens, it has been found that the facial contact between the lens and washer will cause the washer to turn with the lens, and back off the nut, even where the screw is non-rotatably held in the other clamping member.

The principal object of my invention, therefore, is to provide means to prevent both the screw and the nut from being turned when the lens is displaced and to prevent the consequent loosening of the clamping members.

Other objects of my invention are, to increase the threaded area of the nut, and to provide means whereby the clamping screw and nut may adjust themselves to the varying alinements of the perforations in the clamping members and lens in order to adapt the fitting of lenses of various curvatures.

Figure 8:
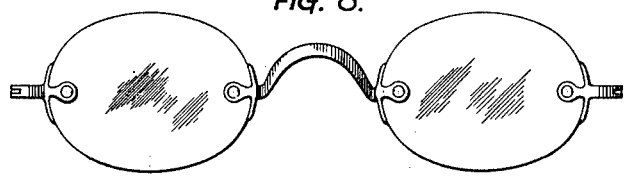
Figure 1:
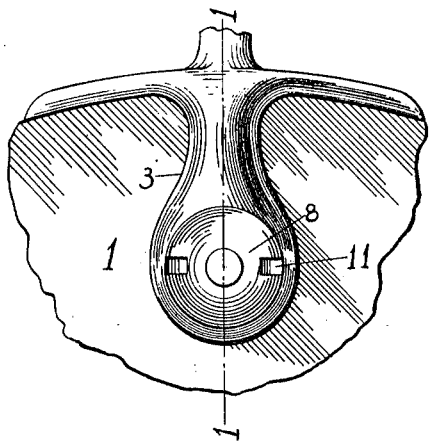
Figure 2:
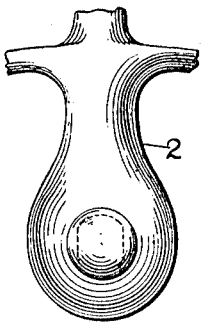
Figure 3:
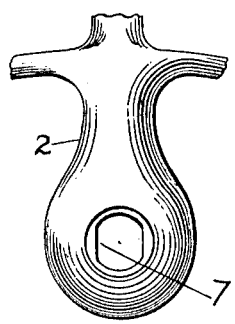
Figure 6:
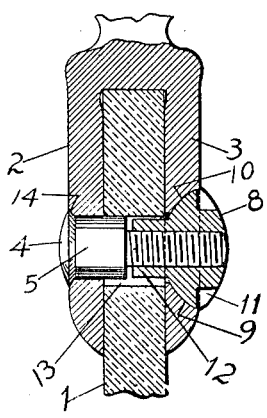
Figure 5:
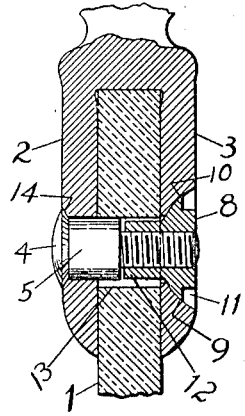
Figure 4:
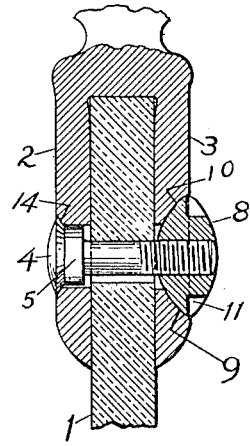
Figure 7:
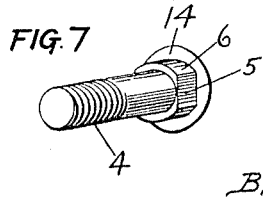

I attain these objects by the construction illustrated in the accompanying drawing in which:

Figure 1, represents the rear elevation of a portion of an eyeglass or spectacle lens embodying my invention, showing the nut end of the screw. Fig. 2, represents a front elevation of Fig. 1, showing the head of the screw. Fig. 3, represents Fig. 2, with the screw removed, recess for screw head shown. Fig. 4, represents a sectional view taken on line 1— 1— Fig. 1. Fig. 5, represents Fig. 4, with a modified form of nut, having shoulders extending into the recess in the lens. Fig. 6, represents Fig. 4, with a second modification of the nut. Fig. 7, represents the screw, underhead shown. Fig. 8, represents a pair of rimless spectacles with my improvement attached.

Similar figures refer to similar parts throughout the several views.

Referring to the drawings: The lens 1 is clamped or held between ears or clamping members 2 and 3 which are attached to the mounting in some one of the usual ways, the lens and clamping members being perforated in the usual manner for the admission of the lens screw 4. A flattened portion 5 on a shoulder 6 under the head of the screw 4 fits in a corresponding recess 7 in the clamping member 2 adjacent to the opening for the screw and prevents the screw from turning when in clamped position. The screw 4 also has a shallow spherical or conical underhead 14 adapted to seat itself in a countersink in the clamping member 2. A nut 8 having a frusto-spherical underhead 9 fits in a corresponding recess 10 extending into the clamping member 3 and surrounding the perforation therein for admission of the lens screw 4 and is advanced or retired on the threaded portion of the screw by means of the recesses or slots 11.

In Figs. 5 and 6 modified forms of nuts are shown. These nuts have shoulders 12 extending into the recess of the lens, the said recess being larger in diameter than the shoulder, to allow play of same therein. The nut in Fig. 5 has a head flush with the face of the clamping member 3, while that shown in Fig. 6 has a raised head similar to that indicated in Fig. 4. The object of these extending shoulders and heads, is to increase the contracting thread area between the screw and nut as far as possible within practicable limits, in order to prevent the stripping of threads. The shoulder 6 on the screw 4 is also extended into the recess in the lens acting as a bearing shoulder for the side of the hole in the lens and preventing contact between the lens and the shoulder on the nut. This will provide against the lens catching on and turning the nut when the lens is displaced.

The parts may be assembled as follows: The perforated lens 1 is placed between the perforated clamping members 2 and 3, and the perforations alined. The lens screw 4 is next inserted in the perforations, the flattened shoulder 5, being fitted in the corresponding recess 7 in the clamping member 2. Nut 8 is then placed on the screw 4 and advanced thereon by means of a screw driver or other instrument inserted in the recess 11, until the clamping members are brought into close engagement with the lens.

The functions of the several parts of my invention are as follows: The flattened recess in clamping member 2 engages the flattened shoulder 5 of the lens screw 4 and prevents it from turning when the nut has been driven up into contact position with clamping member 3, while the clearance 13 in the recess in the lens, and the frustospherical underbody 9 of the nut 8 permits the lens screw and nut to adjust themselves to a number of alinements assumed by the perforations of the lens and clamping members to accommodate the curvature of different lenses. The underhead 9 of the nut 8 bears on the walls of the recess 10 in clamping member 3 while the head 14 of the screw bears on the clamping member 2, consequently, when the nut 8 is advanced the clamping members 2 and 3 are drawn toward each other until they bear against and clamp the lens between them. Nut 8 is designed so that it has no contact either with the face of the lens or with the sides of the hole in the lens for the screw, the only contact with the lens along the perforation being with the non-rotatable screw, hence, all members in contact with the lens are non-rotatably fixed.

It will be seen that by increasing the thickness of the nut, the tendency to strip the thread is materially reduced, hence, greater pressure can be put on the screw and a firmer and more enduring clamp on the lens secured, and that the necessity for replacing screws and nuts is reduced in proportion as the tendency to strip the thread is reduced.

I have shown and described my invention as preferably applied as a lens clamp for frameless spectacles and eyeglasses, but it is apparent that such a clamp can be used for a variety of purposes wherein it is desired to clamp an article between embracing members and I, therefore, consequently do not wish to be limited to the use of my invention as a lens clamp alone.

Having now described my invention, what I claim as new and desire to secure by Letters Patent is:

1. In a clamping device of the nature described, the combination of a perforated object to be clamped, perforated clamping members, a clamp extending through the clamping members comprising a male member having non-rotatable contact with one of the clamping members and a female member socketed in the other clamping member and means to prevent the female member of the clamp from contacting with the clamped object.

2. In a clamping device of the nature described, the combination of a perforated object to be clamped, perforated clamping members, and clamping means extending through the clamping members comprising a male portion non-rotatably engaging one clamping member and a female portion adjustably engaging the other clamping member so as to allow displacement of the transverse alinement of the male portion.

3. In a clamping device of the nature described, the combination of a perforated object to be clamped, perforated clamping members, connecting means inserted through the said perforations having non-rotatable contact with one of the clamping members, and a screw device on said connecting means adjustably engaging the other clamping member so as to permit displacement of the transverse alinement of the connecting means.

4. In a clamping device of the nature described, the combination of a perforated object to be clamped, perforated clamping members, a screw inserted through said perforations having non-rotatable contact with one of the clamping members, and a nut on said screw adjustably engaged with the other clamping member so as to allow adjustment of the transverse alinement of the screw and extending portions adapted to increase the threaded area.

5. In a clamping device of the nature described, the combination of a perforated object to be clamped, perforated clamping members, a screw inserted through said perforations having non-rotatable engagement with one of the clamping members, and a nut on said screw adjustably engaged with the other clamping member so as to compensate for displacement of the transverse alinement of the screw.

6. In a clamping device of the nature described, the combination of a perforated object to be clamped, perforated clamping members, a screw inserted through said perforations having non-rotatable engagement with one of the clamping members, and a nut on said screw seated in a frusto spherical recess in the other clamping member and adapted to automatically adjust the screw to compensate for displacement of the transverse alinement of the screw to accommodate lenses of various curvatures.

7. In a clamping device of the nature described, the combination of a perforated object to be clamped, perforated clamping members, a bolt extending through the perforations, a flat shoulder on the bolt adapted to non-rotatably engage one of the clamping members, and a nut having a curved under body adapted to fit in a recess in the other clamping member so as to adjust itself to displacement of the transverse alinement of the bolt.

8. In a clamping device of the nature described, the combination of a perforated object to be clamped, perforated clamping members, a bolt extending through the perforations, a flat shoulder on the bolt adapted to non-rotatably engage one of the clamping members, a nut having a curved under body adapted to fit in a recess in the other clamping member so as to adjust itself to displacement of the transverse alinement of the bolt, and extending portions adapted to increase the threaded area of the nut.

9. In a device of the nature described, the combination of spaced clamping members having alined perforations, a flat sided counterbore in one member, a spherical countersink in the other member and a clamp through the perforations comprising a male portion non-rotatably engaging the flat sided counterbore and a female portion adjustably engaging the spherical countersink of the clamping members.

In testimony whereof, I affix my signature in presence of two witnesses.

JOEL C. WELLS.

Witnesses:
RALPH E. THOMPSON,
ROBT. S. CALLENDER.